United States Patent
Sexton

(10) Patent No.: US 6,965,802 B2
(45) Date of Patent: Nov. 15, 2005

(54) METHOD FOR USING PORTABLE WIRELESS DEVICES TO MONITOR INDUSTRIAL CONTROLLERS

(75) Inventor: Daniel W. Sexton, Charlottesville, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 207 days.

(21) Appl. No.: 09/731,141

(22) Filed: Dec. 6, 2000

(65) Prior Publication Data

US 2002/0068983 A1 Jun. 6, 2002

(51) Int. Cl.$^7$ .............................................. G05B 15/00
(52) U.S. Cl. ....................... 700/83; 700/66; 700/168; 700/174; 709/217; 709/218; 709/219; 714/46; 714/47; 345/169
(58) Field of Search ............................. 700/83, 66, 168, 700/174; 714/46, 47; 709/217–219; 345/169

(56) References Cited

U.S. PATENT DOCUMENTS

| | | | |
|---|---|---|---|
| 4,843,295 A | | 6/1989 | Thompson et al. |
| 5,673,190 A | | 9/1997 | Kahleck et al. |
| 5,748,104 A | * | 5/1998 | Argyroudis et al. ... 340/870.11 |
| 5,805,442 A | * | 9/1998 | Crater et al. .................... 700/9 |
| 5,869,980 A | | 2/1999 | Chu et al. |
| 6,061,603 A | | 5/2000 | Papadopoulos et al. |
| 6,151,625 A | | 11/2000 | Swales et al. |
| 6,154,035 A | | 11/2000 | Aguirre et al. |
| 6,163,602 A | | 12/2000 | Hammond et al. |
| 6,211,782 B1 | | 4/2001 | Sandelman et al. |
| 6,219,164 B1 | | 4/2001 | Morgaine |
| 6,282,454 B1 | * | 8/2001 | Papadopoulos et al. ....... 700/83 |
| 6,304,788 B1 | * | 10/2001 | Eady et al. .................... 700/86 |
| 6,317,639 B1 | * | 11/2001 | Hansen ......................... 700/83 |
| 6,651,190 B1 | * | 11/2003 | Worley et al. ................. 714/43 |
| 6,658,254 B1 | * | 12/2003 | Purdy et al. ................. 455/445 |
| 6,757,521 B1 | * | 6/2004 | Ying ......................... 455/67.11 |

* cited by examiner

Primary Examiner—Anthony Knight
Assistant Examiner—Thomas Pham
(74) Attorney, Agent, or Firm—Armstrong Teasdale LLP

(57) ABSTRACT

A system and method for controlling and monitoring an industrial controller using a portable wireless device. The system includes a programmable logic controller (PLC), a local server for exchanging communication with the PLC, a Internet Service Provider (ISP) server for exchanging communication with the local server using the Internet, and a wireless user communication device for exchanging communication with the ISP server. A user utilizes the Internet to monitor the operation of the PLC and input control commands to the PLC using the wireless user communication device.

20 Claims, 1 Drawing Sheet

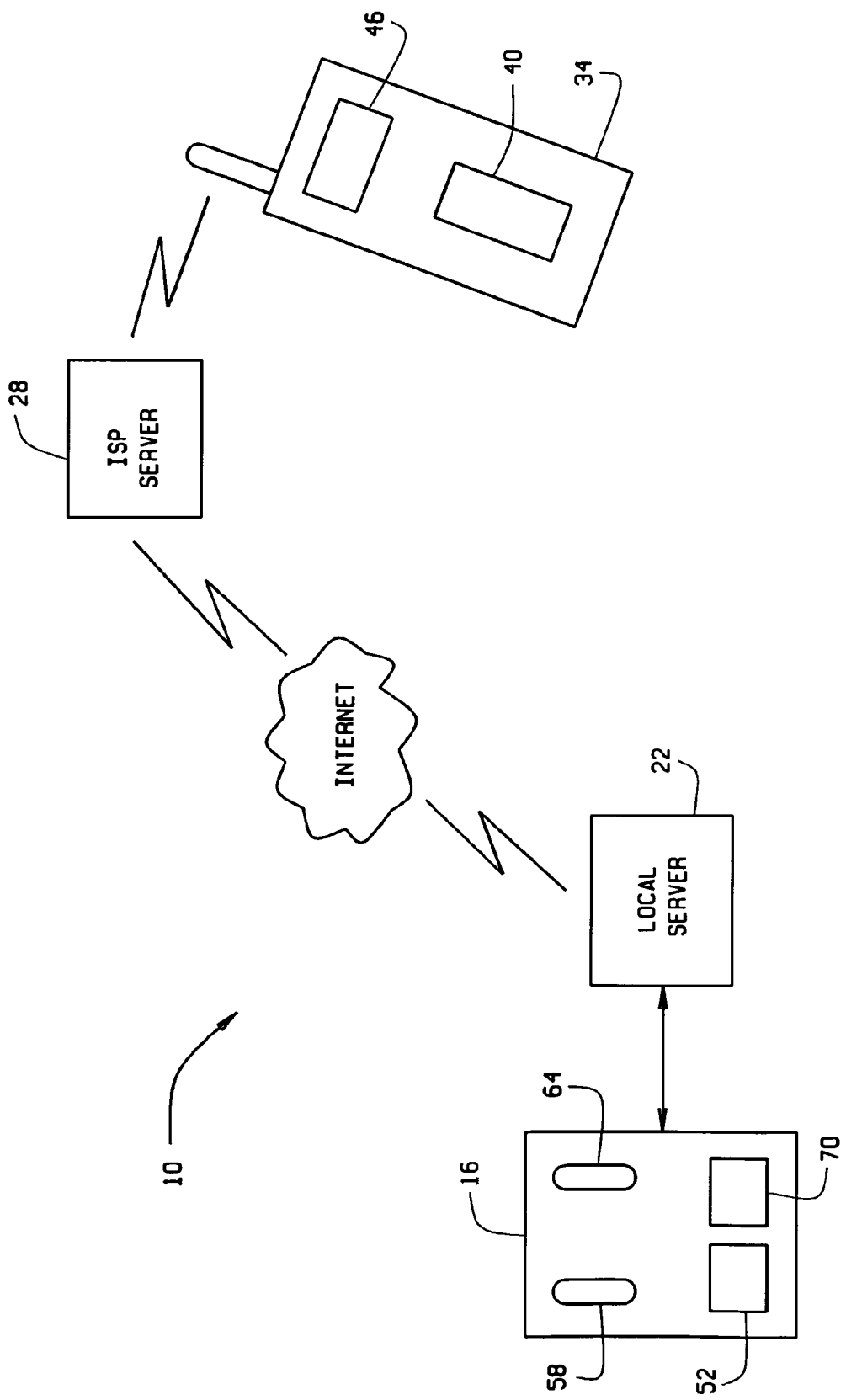

METHOD FOR USING PORTABLE WIRELESS DEVICES TO MONITOR INDUSTRIAL CONTROLLERS

BACKGROUND OF THE INVENTION

This invention relates generally to process controls and more specifically to controlling a process by remotely controlling a programmable logic controller.

Companies can incur great expense when one or more processes are not working correctly or not working at all due to a simple failure or fault within the control system. Maintaining an on site engineer to monitor the process and make the appropriate correction is expensive and time consuming. Known methods of diagnosing and correcting control system faults remotely, typically require that an engineer handling the remote corrections have the proper PLC data available to him and is aware of the problem. There is a need for an off site engineer to have the capability to remotely monitor the operation of a PLC, obtain the proper PLC data that allows the engineer to become aware of a problem, diagnose control system failures and faults, and remotely adjust the operation of the PLC.

BRIEF SUMMARY OF THE INVENTION

In an exemplary embodiment, a programmable logic controller (PLC) is remotely controlled and monitored using a local server, the Internet, and a portable wireless device. A system for remotely monitoring and controlling input and output I/O devices connected to and controlled by a PLC includes a programmable logic controller (PLC), and a local server for exchanging communication with the PLC. The system further includes a wireless Internet Service Provider (ISP) server for exchanging communication with the local server using the Internet, and a wireless user communication device for exchanging communication with the ISP server. A user utilizes the Internet to remotely monitor the operation of a process being controlled by the PLC and inputs control commands to the PLC using the wireless user communication device.

More particularly, the wireless ISP provides a user with access to the Internet using the wireless user communication device. The PLC is connected to the local server, which is linked to the Internet and includes communication drivers that enable the PLC and local server to exchange communications. Using the wireless communication device, a user accesses the Internet to communicate with the local server, access PLC operational data, and input PLC commands and operational response data. Thus, a user can remotely diagnose and correct PLC problems, thereby avoiding costs incurred when the PLC adversely affects the process it controls.

BRIEF DESCRIPTION OF THE DRAWINGS

FIG. 1 is schematic of a system for remotely controlling and monitoring a controller using a portable wireless device in accordance with one embodiment of the present invention.

DETAILED DESCRIPTION OF THE INVENTION

FIG. 1 is a schematic of a system 10 for remotely controlling and monitoring an industrial controller using a portable wireless device. System 10 includes a programmable logic controller (PLC) 16, a local server 22 that exchanges communication with PLC 16, an Internet service provider (ISP) server 28 that utilizes the Internet to exchange communication with local server 22, and a wireless user communication device 34, which exchanges communication with ISP server 28. Wireless communication device 34 includes a user input device 40 for inputting commands and data to be transmitted to PLC 16 over the Internet and a display 46 to view information retrieved from the PLC over the Internet.

In operation, PLC 16 is used to control an industrial process (not shown) by outputting control signals or commands in response to various inputs. PLC 16 is a computer like device, having a processor 52, that reads, for example, voltage levels at terminals of an input module 58 and energizes terminals of an output module 64 based on a program stored in a programmable memory 70. PLC 16 is capable of using a plurality of input modules 58 and a plurality of output modules 64. A user programs PLC 16 with a program that is stored in memory 70 and executed by processor 52. The program is a list of instructions that provide the desired results by monitoring the terminals of input module 58, and based on the state of the inputs, turn 'ON' or 'OFF' terminals of output module 64, thereby controlling one or more devices connected to PLC 16.

A programming device (not shown) uses a suitable programming language, such as ladder logic, to enter the program into memory 70. An exemplary programming device is a hand held programmer or a laptop computer. Generally, processor 52 continuously cycles through the program stored in memory 70, for example, checking the status of all terminals of input module 58 and determining program paths to follow based on input module 58 readings and updating the terminals of output module 64. When checking the status of input module 58, PLC 16 scans each individual input terminal to determine the state of each terminal, i.e. whether the terminal is 'ON' or 'OFF'. If there is voltage present at the terminal it is considered 'ON', while if no voltage is sensed the terminal is considered 'OFF'. This data is stored in memory 70. Processor 52 then executes the program stored in memory 70 and based on the input data the status of each terminal of output module 64 is updated.

In one embodiment, input module 58 is an input module that receives discrete inputs from devices such as limit switches, electric eyes, and push buttons. In another embodiment, input module 58 is an analog input module that uses an analog to digital converter to sense variables such as temperature, speed, pressure, and position and put the read data into a format that processor 52 can read. In yet another embodiment, input module 58 is an input module that receives inputs, for example AC or DC current, from devices such as mechanical switches. Additionally, input module 58 provides electrical isolation between the input terminals of input module 58 and processor 52 to protect PLC 16 from damage caused by electromagnetic interference (EMI) or radio frequency interference (RFI). Components such as optical isolators or optocouplers are used to provide electrical isolation on input module 58.

Output module 64 is capable of use with AC or DC devices such as solenoids, relays, contactors, pilot lamps, LED readouts and other electro-mechanical devices. PLC 16 uses a power source to run processor 52 and drive the output terminals of output module 64, which are configured to minimize EMI and RFI. Therefore, output module 64 uses components such as optical isolators and optocouplers to provide electrical isolation between PLC 16 and a load (not shown) connected to output module 64. In an alternate embodiment, output module 64 is an analog output module that uses a digital to analog converter to produce analog outputs to devices such as motor operated valves and pneumatic position control devices.

Monitoring and controlling PLC 16 enables a person, such as a process or maintenance engineer, to regulate processes. In one embodiment, PLC 16 is linked to local server 22 using a network, such as a local area network (LAN). The communications mechanism between PLC 16 and local server 22 is any suitable PLC protocol, for example TCP/IP over an Ethernet. Furthermore, local server 22 is equipped with a suitable communications driver (not shown) that matches the communications mechanism of PLC 16. Therefore, appropriate persons with network access to local server 22, retrieve PLC operational data from PLC 16, analyze the data, and send PLC operational response data and commands to PLC 16. Thus, an engineer that does not have direct access to PLC 16 monitors and diagnoses the performance of PLC 16 and makes appropriate corrections using a network connection to local server 22.

In an alternate embodiment, an offsite engineer utilizes the Internet to access local server 22 thereby gaining access to PLC 16. PLC 16 is connected to local server 22 using a network, as described above. Additionally, local server 22 is adapted to access the Internet, thereby enabling an offsite engineer equipped with wireless communication device 34 to utilize ISP server 28 to access the Internet and communicate with local server 22. By accessing local server 22, the offsite engineer has access to PLC 16 to retrieve dynamic PLC operational data on demand from PLC 16. The engineer diagnoses the operational data, then sends PLC operational response data and appropriate control commands to PLC 16 to change or correct the performance of PLC 16. If the needed corrective actions are not feasible to make from a remote site, the offsite engineer contacts on-site personnel to take the necessary actions. Additionally, the off-site engineer, based on the diagnosis, has the advantage of knowing what equipment or supplies are needed to correct the problem when he arrives at the site, thereby saving system down time.

When operational data is requested from PLC 16, local server 22 transmits the data to ISP server 28, which formats and processes the data into Wireless Markup Language (WML). WML is a markup language intended to specify content and a user interface for narrow band devices, including cellular phones, personal data assistants (PDA's), and pagers. WML is designed for use with wireless devices having small displays, limited user input facilities, narrow band network connection, and limited memory and computational resources.

After the operational data is formatted into WML, ISP server 28 utilizes a Wireless Application Protocol (WAP) to transmit the data to wireless communication device 34. WAP is an open, global specification that enables users of wireless devices, such as cellular phones, PDA's, and pagers to easily access and interact with information and services over the Internet. WAP compensates for constraints of handheld wireless devices, such as a small display and input devices, and limited computational resources, thereby enriching Internet access by wireless devices.

Once the operational data is converted to WML and sent to wireless communication device 34 using a WAP, the user views and analyzes the data. After the user analyzes the data, the user utilizes input device 44 to enter PLC commands and operational response data into wireless communication device 34. The input commands and response data are communicated to ISP server 28 and then sent to local server 22. Local server 22 converts the data to the appropriate PLC communications protocol. Wireless communication device 34 is a portable wireless device such as a cellular phone, PDA, pager, or any device supporting a WML browser.

In an exemplary embodiment relating to a power generation station (not shown), an offsite engineer utilizes system 10 to determine that there is a problem in a fault table (not shown) of PLC 16. The offsite engineer resets the faults and continues to monitor PLC 16 via wireless communication device 34. If the problem persists the offsite engineer further diagnoses the problem to determine a cause, for example, a specific I/O module (not shown) of PLC 16 is bad. The offsite engineer then utilizes the information to determine a replacement part number for the I/O module and verifies whether a replacement I/O module is in stock on-site or whether the replacement part needs to be ordered. Using this information the off-site engineer is able to verify that the part will be on-site when he returns, thereby allowing him to restore the power generation station to operation more quickly.

Thus, by leveraging the cellular infrastructure that has been constructed by cellular telephone companies, an offsite engineer utilizes ISP server 28, the Internet, and local server 22 to monitor, diagnose, and control PLC 16 via wireless communication device 34 from any location with cellular Internet access in the world.

While the invention has been described in terms of various specific embodiments, those skilled in the art will recognize that the invention can be practiced with modification within the spirit and scope of the claims.

What is claimed is:

1. A method for controlling and monitoring an industrial controller using a portable wireless device, utilizing a system including a programmable logic controller (PLC), a local server, and a wireless Internet Service Provider (ISP), said method comprising the steps of:

monitoring and controlling a system using a programmable logic controller (PLC);

exchanging communications between the PLC and a local server;

exchanging communications between the local server and a wireless Internet Service Provider (ISP) server utilizing the Internet;

configuring the local server to communicate with the PLC via a local area network and to convert an Internet protocol into a protocol compatible with the PLC;

transmitting, via the wireless ISP server, commands from a wireless user communication device to the PLC, wherein the PLC is configured to determine whether to energize an output module based on a state of an input module;

displaying information retrieved from the PLC using the wireless ISP server; and controlling said PLC, via said wireless ISP server, by formatting, in a wireless markup language, responses to the commands.

2. A method in accordance with claim 1 wherein said step of exchanging communications between the PLC server and the local server further comprises the step of sending PLC operational data from the PLC to the local server.

3. A method in accordance with claim 2 wherein said step of exchanging communications between the local server and the ISP server further comprises the step of sending the PLC operational data from the local server to the wireless ISP server.

4. A method in accordance with claim 3 wherein the wireless user communication device includes a display for displaying information, said method further comprising exchanging communications between the wireless ISP server and the wireless user communication device, wherein said step of exchanging communications between the wireless ISP server and the wireless user communication device further comprises the steps of:
   sending the PLC operational data from the wireless ISP server to the wireless user communication device; and
   displaying the PLC operational data on the wireless user communication device display.

5. A method in accordance with claim 3 further comprising formatting and processing the PLC operational data into the wireless markup language.

6. A method in accordance with claim 5 further comprising transmitting the PLC operational data to the wireless user communication device by applying a wireless application protocol to the PLC operational data.

7. A method in accordance with claim 1 wherein the wireless user communication device includes an input device for inputting information to the wireless user communication device, said method further comprising exchanging communications between the wireless ISP server and the wireless user communication device, wherein said step of exchanging communications between the ISP server and the wireless user communications device further comprises the steps of:
   inputting at least one PLC command;
   inputting PLC operational response data using the input device;
   sending the at least one PLC command from the wireless user communication device to the wireless ISP server; and
   sending the PLC operational response data from the wireless user communication device to the wireless ISP server.

8. A method in accordance with claim 7 wherein said step of exchanging communications between the local server and the wireless ISP server further comprises the steps of:
   sending the at least one PLC command from the wireless ISP server to the local server using the Internet; and
   sending the PLC operational response data from the wireless ISP server to the local server using the Internet.

9. A method in accordance with claim 8 wherein said step of exchanging communications between the PLC and the local server further comprises the steps of:
   sending the at least one PLC command from the local server to the PLC; and
   sending the PLC operational response data from the local server to the PLC.

10. A method in accordance with claim 8 wherein said step of monitoring and controlling further comprises the steps of:
   controlling an operation of the PLC using the at least one PLC command; and
   controlling the operation of the PLC using the PLC operational response data.

11. A system for controlling and monitoring an industrial controller using a wireless device, said system comprising:
   a programmable logic controller (PLC);
   a local server configured to exchange communication with said PLC;
   a wireless Internet Service Provider (ISP) server configured to exchange communication with said local server using the Internet, said local server implemented within a single device physically separate from said PLC, coupled to said PLC via a local area network, and configured to convert an Internet protocol into a protocol compatible with said PLC, and said wireless ISP server configured to control said PLC by formatting, in a wireless markup language, a set of responses to a set of commands; and
   a wireless user communication device configured to exchange communication with said wireless ISP server, wherein said PLC configured to exchange communication via said wireless ISP server with said wireless user communication device and configured to determine whether to energize an output module based on a state of an input module.

12. A system in accordance with claim 11 wherein said local server further configured to access PLC operational data from said PLC.

13. A system in accordance with claim 12 wherein said local server further configured to communicate the PLC operational data to said wireless ISP server.

14. A system in accordance with claim 13 wherein said wireless ISP server further configured to communicate the PLC operational data to said wireless user communication device.

15. A system in accordance with claim 14 wherein said wireless user communication device further configured to display the PLC operational data.

16. A system in accordance with claim 11 wherein said wireless user communication device further configured to initiate at least one PLC command and communicate the PLC command to said wireless ISP server.

17. A system in accordance with claim 16 wherein said wireless user communication device further configured to initiate PLC operational response data and communicate the PLC operational response data to said wireless ISP server.

18. A system in accordance with claim 17 wherein said wireless ISP server further configured to communicate the at least one PLC command and the PLC operational response data to said local server.

19. A system in accordance with claim 18 wherein said local server further configured to communicate the at least one PLC command and the PLC operational response data to said PLC.

20. A system in accordance with claim 11 wherein said wireless user communication device comprises:
   a user interface configured for an input of information to said wireless user communication device; and
   a display configured to display the user input information and information received by said wireless user communication device from said wireless ISP server.

* * * * *